United States Patent [19]

Bentzen-Bilkvist et al.

[11] 4,195,954

[45] Apr. 1, 1980

[54] MECHANICAL AERATOR FOR SUCTION NOZZLE

[75] Inventors: Ib Bentzen-Bilkvist, Ann Arbor; Robert L. Hallett, Dundee, both of Mich.

[73] Assignee: Dundee Cement Company, Dundee, Mich.

[21] Appl. No.: 898,849

[22] Filed: Apr. 21, 1978

[51] Int. Cl.² ............................................. B65G 53/42
[52] U.S. Cl. ...................................... 406/135; 406/152
[58] Field of Search ..................... 302/11, 12, 13, 38, 302/56, 58; 214/15 D, 17 DB; 198/498, 515, 518; 406/152, 71, 135; 414/142

[56] References Cited

U.S. PATENT DOCUMENTS

| | | | |
|---|---|---|---|
| 1,550,311 | 8/1925 | Foster | 214/17 DB |
| 2,446,573 | 8/1948 | Cameron | 302/58 |
| 2,634,962 | 4/1953 | Eglitis | 214/17 DB |
| 2,652,920 | 9/1953 | Bowman | 198/498 |
| 2,717,812 | 9/1955 | Eglitis | 302/56 |
| 2,905,506 | 9/1959 | Kristensen | 302/58 |
| 3,268,053 | 8/1966 | Llewellyn | 198/515 |

*Primary Examiner*—Jeffrey V. Nase
*Attorney, Agent, or Firm*—Cullen, Sloman, Cantor, Grauer, Scott & Rutherford

[57] ABSTRACT

In a nozzle assembly for vacuum unloading of dry, bulk, particulate material, one or more mechanical aerators are mounted on horizontal axes with a scraper positioned intermediate the aerators. Dry bulk particulate material is mechanically aerated, by the rotation of the aerators, and fed to the suction end of the nozzle. Each mechanical aerator includes a plurality of paddles mounted on an elongated horizontal shaft and the paddles and the scraper together enable the nozzle to clean down to the bottom of a barge or ship in which the particulate material is stored. The suction end of the nozzle includes a shroud, to control dust emission, and has a flared end which, in combination with the aerators and the scraper assists in breaking up any lumps in the dry bulk particulate material and in reducing the amount of particulate material which becomes airborne.

12 Claims, 11 Drawing Figures

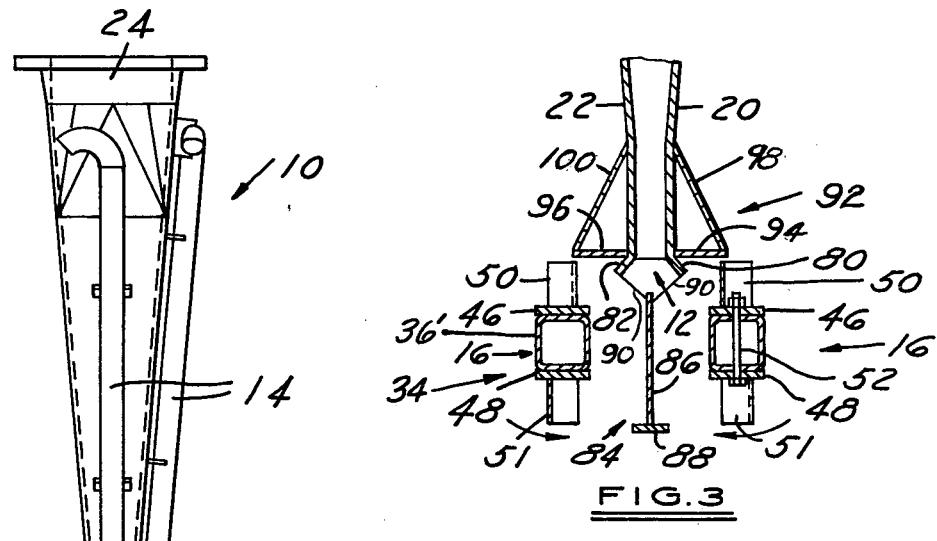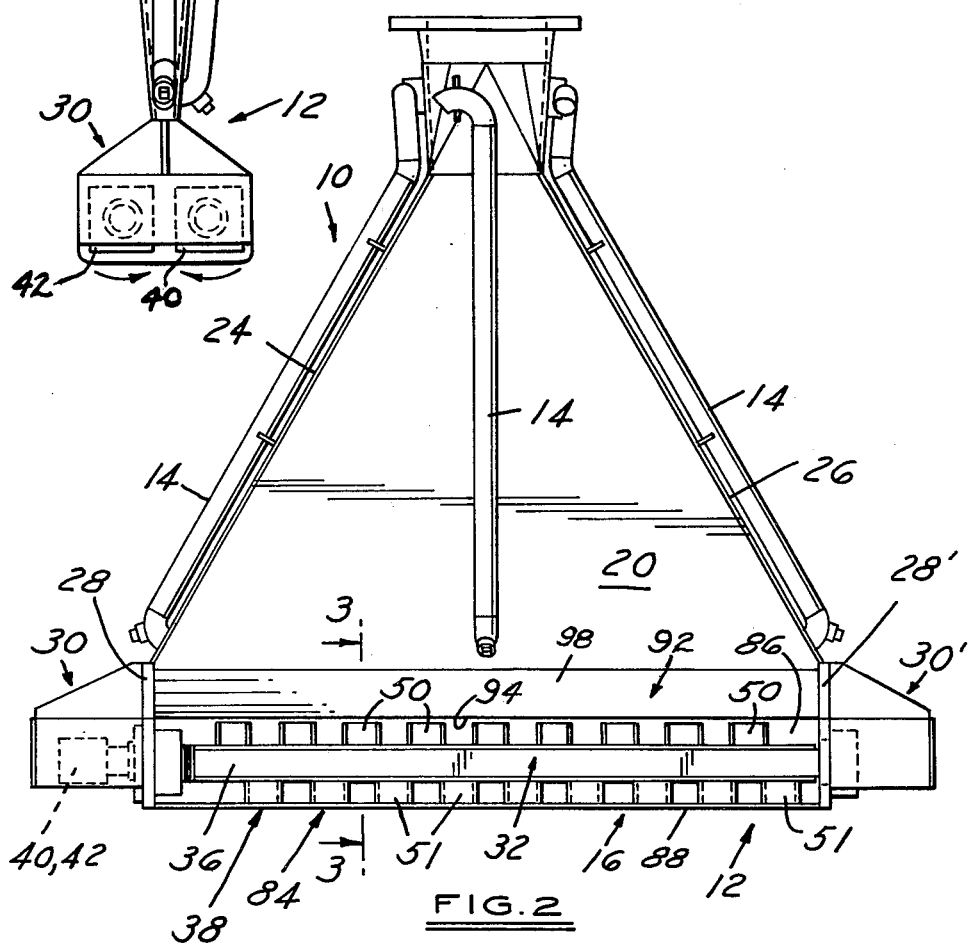

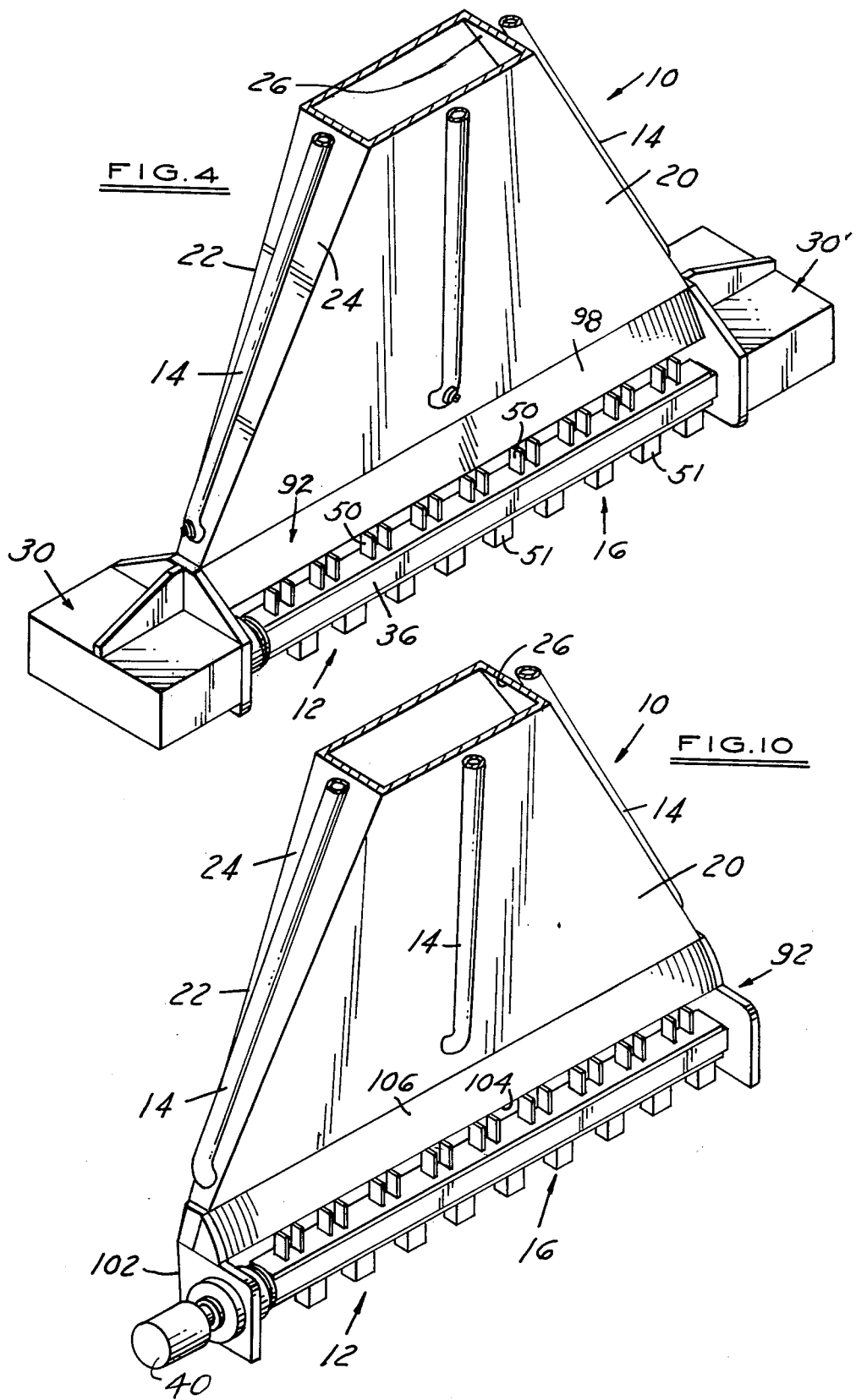

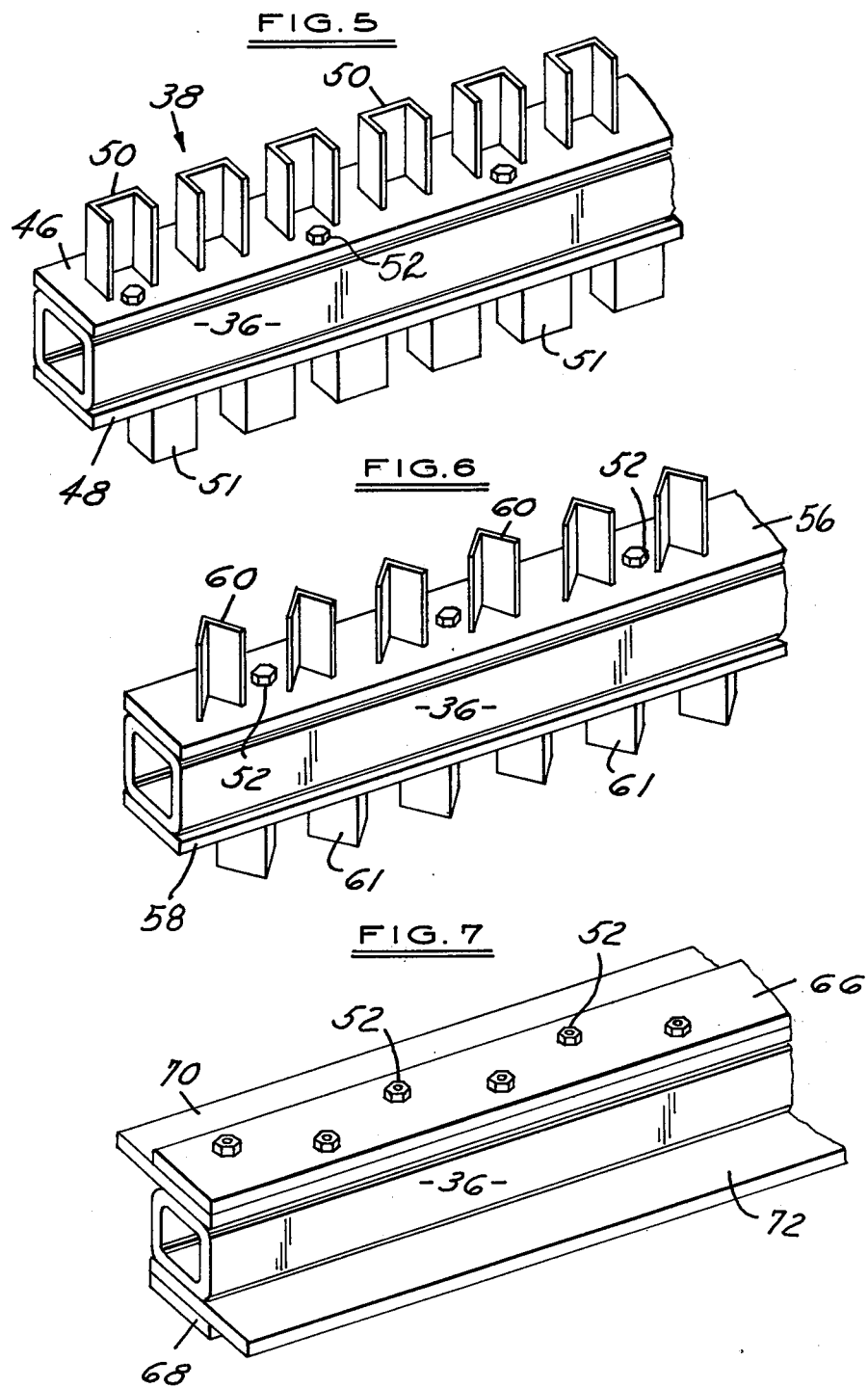

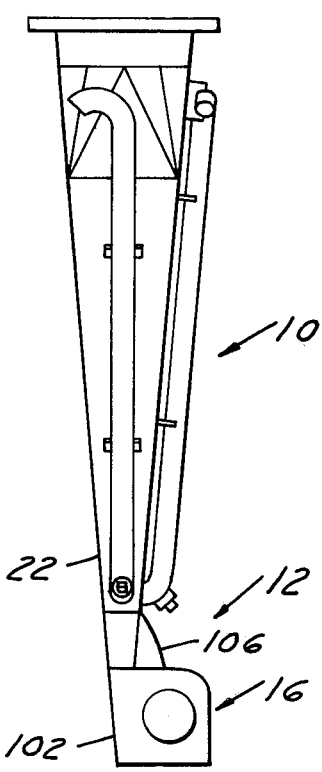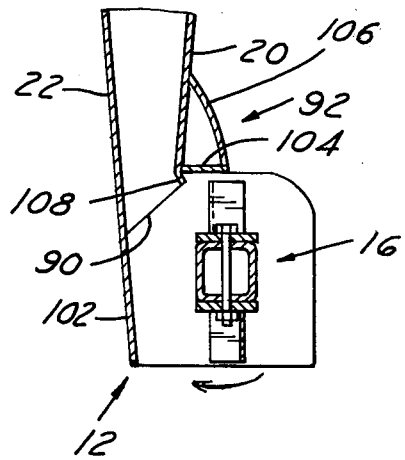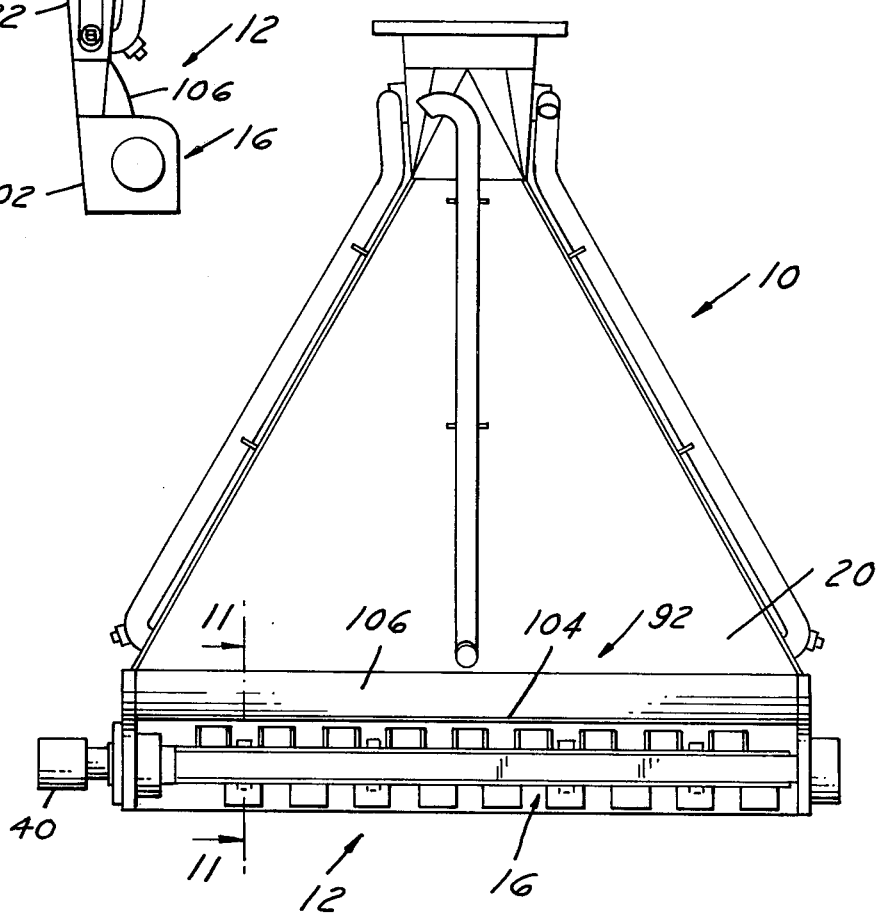

MECHANICAL AERATOR FOR SUCTION NOZZLE

BACKGROUND OF THE INVENTION

This invention relates generally to an improved assembly for the vacuum end of a nozzle utilized in unloading dry bulk particulate material from a container such as a vessel, a river barge, an ocean going ship or the like. Systems utilizing the vacuum technique to transfer dry bulk particulate material are, of course, well known as described in U.S. Pat. No. 3,373,883 assigned to the Assignee of the present invention.

In the unloading of dry bulk particulate material such as cement powder, grain or fertilizer, it is known that the material is fluidized when mixed with a transport medium such as air and thus may be conveyed and transported as if it were a fluid. The actual conveying or transporting of the fluidized particulate material is accomplished by a nozzle connected ultimately to a vacuum pump, to provide suction, or negative pressure, as is conventional.

Heretofore, mechanical scoops and aerators, mounted on vertical axes adjacent the suction end of the nozzle, assisted in aerating the dry bulk particulate material and in moving the particulate material toward the suction opening of the nozzle. Once the particulate material passed into the suction opening of the nozzle, it moved along an elongated conduit to a suction source and a separator. This all was conventional.

In prior art suction nozzle systems, with or without mechanical aerators, several problems existed. One problem was the inability of the nozzle assembly to clean or remove the particulate material all the way down to the floor of the barge, ship, vessel, or other container. This necessitated the use of an additional final clean-up step using apparatus such as a front end loader. Such a final clean-up step was an expensive operation in terms of time, labor and equipment.

A second problem with prior art suction nozzle systems was the amount of dust created by the system, i.e., the amount of particulate material which became airborne because of movement of the material toward the nozzle under influence of the suction, regardless of whether aerators were used, and when aerators were used, because of the rotation of the aerators in the dry particulate material.

The third problem was the inability of the nozzle, either alone or with aerators, to break up lumps in the particulate material. For example, in particulate material such as cement powder, the consistency of cement powder can be normal or lumpy. The concept of lumpy cement powder is a well known problem and can occur in one of two fashions. First, moisture from "free water" such as water entering through the cover of the barge, rain during loading and unloading, etc., often causes portions of the cement powder to form large lumps. A second problem, if the cement powder when processed initially is at too elevated a temperature or is at too elevated a temperature when stored, results in water crystallization of the gypsum component of the cement powder thus also causing lumps in the powder. Essentially, therefore, the lumpiness of the cement powder is a function of moisture content.

Prior mechanical aerators were unable to break up lumps in the powder and consequently caused the suction end of the nozzle to become clogged.

SUMMARY OF THE INVENTION

The present invention provides a unique solution to the aforementioned problems including the inability of prior mechanical aerators to clean down to the floor of a barge, the inability of prior aerators to break up lumps in the particulate material, and the excessive dust emissions.

Specifically, one or more mechanical aerators are horizontally mounted at the suction end of the nozzle assembly and are rotatable about horizontal axes. The mechanical aerators, which aerate and feed the particulate material to the suction end of the nozzle include paddle means for breaking up lumps. A scraper is provided intermediate the aerators and the scraper and the mechanical aerators cooperate for cleaning down to the floor of a barge.

The suction end of the nozzle is flared outwardly and a shroud is provided at the suction end of the nozzle just above the nozzle flare. The shroud and flare cooperate to reduce dust emission by reducing the amount of particulate material which would heretofore become airborne.

The aerators, scraper and nozzle flare further cooperate to break up lumps in the particulate material.

The present invention includes several types of mechanical aerators. A first mechanical aerator includes elongated paddles which serve to aerate the particulate material and clean to the bottom of the ship and break up lumps in the particulate material. A second aerator includes a plurality of V-shaped channel paddles which are more effective in lumpy particulate material than the elongated paddles. Finally, the preferred mechanical aerators includes U-shaped channel paddles which break up lumpy particulate material and enable the nozzle to clean to the bottom of the barge.

It is a further part of the present invention to provide a horizontally mounted mechanical aerator having a rotatable shaft and aimproved mounting plates for the paddles which plates are easily secured to the rotatable shaft. The mechanical aerator of the present invention includes both top and bottom mounting plates each having channel-shaped paddles mounted thereon. When U-shaped or V-shaped paddles are used, the paddles on the top mounting plate are spaced apart, and the paddles on the bottom mounting plate are also spaced apart and are aligned with the spaces between paddles on the top mounting plate. Thus as the aerator rotates there are no gaps along the longitudinal extent of the aerator. The convenience of mounting and interchangeability of type of paddles provided by this arrangement is an additional advantage of the present invention.

The present invention also contemplates the use of a single mechanical aerator mounted on a horizontal axis in a housing which functions as the scraper. This provides a suction nozzle system for smaller barges and functions effectively for the aforementioned purposes of controlling dust emission, breaking up lumpy particulate material and cleaning to the bottom of the barge.

BRIEF DESCRIPTION OF THE DRAWINGS

The various objects and advantages of the present invention, together with other objects and advantages which may be attained by its use, will become more apparent upon reading the following detailed description of the invention taken in conjunction with the drawings.

In the drawings, wherein like reference numerals identify corresponding components:

FIG. 1 is a side elevation view of a preferred embodiment of the present invention including a suction nozzle having two mechanical aerators mounted on horizontal axes;

FIG. 2 is a front elevation view of the mechanical aerators and nozzle assembly of FIG. 1;

FIG. 3 is a partial side elevation view of the nozzle suction end and aerator assembly of FIG. 2 as seen in the plane of arrows 3—3 of FIG. 2;

FIG. 4 is a partial perspective illustration of the nozzle suction end and the mechanical aerators of FIGS. 1–3 of the present invention;

FIG. 5 is a partial perspective illustration of a preferred embodiment of the mechanical aerator of the present invention;

FIG. 6 is a partial perspective illustration of a second embodiment of the mechanical aerator of the present invention;

FIG. 7 is a partial perspective illustration of a third embodiment of the mechanical aerator of the present invention;

FIG. 8 is a side elevation view of the present invention including a single mechanical aerator mounted on a horizontal axis;

FIG. 9 is a front elevation view of the suction nozzle and aerator assembly of FIG. 7 with the housing removed;

FIG. 10 is a partial perspective illustration of the suction nozzle and aerator assembly of FIGS. 8 and 9; and FIG. 11 is a partial side elevation view of the nozzle suction end as seen in the plane of arrows 11—11 of FIG. 9.

DETAILED DESCRIPTION OF THE INVENTION

The present invention is directed to an improvement in a system for vacuum unloading of dry bulk particulate material including fluidizing the material with a transport medium such as air, so the material flows as though it were a fluid, and thereafter separating the transport air from the material. An overall system of this type is described in U.S. Pat. No. 3,373,883, assigned to the Assignee of the present invention, the disclosure of which is hereby incorporated by reference. An improved nozzle having mechanical aerators mounted on vertical shafts is further described in co-pending application Ser. No. 833,120, now U.S. Pat. No. 4,140,350 of Feb. 20, 1979 assigned to the Assignee of the present invention, which disclosure is also incorporated herein by reference.

Briefly, a vacuum source is connected through a conduit to the first or upper end of a suction nozzle 10. The suction or vacuum draws the dry bulk particulate material in through the suction end 12 of the nozzle, through the conduit and to a conventional separator which removes the fluidizing and transporting air from the dry bulk particulate material so that the particulate material may be retained in a storage vessel such as a silo. The broad combination of a nozzle, conduit, vacuum source and separator is, of course, conventional.

In order to transport dry bulk particulate material from a vessel such as a barge, ocean going ship or the like, it should be both aerated and fluidized. To fluidize the material, it is necessary to provide a transport medium such as air to the nozzle. According to the principles set forth in co-pending application Ser. No. 833,120, hollow tubes 14 are provided adjacent the nozzle. The hollow tubes have upper ends opening outwardly into the ambient air and lower ends which enter the nozzle at the suction end. The combination of the vacuum and the amount of dry bulk particulate material being drawn into the suction end of the nozzle provides a self-regulating function to draw sufficient transport air in through the tubes 14 to properly fluidize the dry bulk particulate material.

The dry bulk particulate material, whether it be grain, fertilizer, cement powder or the like, is mechanically aerated and conveyed toward the suction end 12 of the nozzle 10 by front and rear mechanical aerators 16. The provision of mechanical aerators for this purpose is also old although the prior art mechanical aerators have typically been mounted on vertical shafts and rotate in a horizontal plane below and laterally outside of the suction end of the nozzle as set forth in the co-pending application Ser. No. 833,120.

As will be more fully described, the mechanical aerators of the present invention rotate about a horizontal shaft, rather than a vertical shaft, for providing the synergistic results heretofore described.

With reference to FIGS. 1 through 4, the nozzle 10 includes generally flat, tapered front and rear face plates 20, 22, respectively and is generally trapezoidal in configuration, i.e., smaller at the top and larger at the bottom. The front and rear face plates are interconnected by edge or side plates 24, 26 to provide a hollow nozzle configuration. Depending vertically downward from the suction end 12 of the nozzle and more specifically from the edges plates 24, 26, are end plates 28, 28[1] at the two edges or sides of the nozzle. A generally rectangular housing 30 is positioned outwardly from the nozzle end plate 28 and a similar generally rectangular housing 30[1] is provided at the opposite side of the nozzle extending outwardly from the end plate 28[1].

Means are provided for mechanically aerating the dry bulk particulate material and for feeding the dry bulk particulate material to the suction end 12 of the nozzle. Specifically, in a first embodiment, the mechanical aerators 16 each comprise a pair of rotatable aerators 32, 34. Each of the rotatable aerators includes an elongated hollow drive shaft 36, or 36[1], respectively, of generally square cross section having paddle means 38 secured thereto. Each end of shafts 36 and 36[1] is suitably mounted for rotation with one end of each of shafts 36 and 36[1] in the housing 30[1] being mounted in a suitable bearing and the end of each of shafts 36, 36[1] in the housing 30 being mounted in a suitable bearing and also connected to the output shaft of a motor. Rotation of the output shaft of a motor 40 rotates the shaft 36 of the mechanical aerator 32. In a preferred embodiment, a second motor 42 is provided to rotate the shaft 36[1] of the aerator 34.

The motors serve to rotate the shafts of the aerators in opposite directions as seen generally in FIGS. 1 and 3 so that the front aerator 32 rotates clockwise and the rear aerator 34 rotates counterclockwise. The designations of front and rear are for illustrative purposes only corresponding to the front and rear faces 20, 22 of the nozzle 10 and are not used as limitations. What is important in this regard is that the aerators rotate to feed or convey the particulate material inwardly and upwardly toward the suction end 12 of the nozzle.

With reference now to FIGS. 2 through 5, the paddle means 38, which extend the full width of the nozzle, of the present invention will now be described. The paddle means 38 are secured to the shaft 36 which in turn is mounted for rotation about a horizontal axis. The paddle means of the embodiment of FIG. 5 includes an upper mounting plate 46 and a lower mounting plate 48 secured to opposite sides of the shaft 36. A plurality of U-shaped channel members 50 are welded to the mounting plate 46 and a plurality of U-shaped channel members 51 are welded to the mounting plate 48. A plurality of bolts 52 extend through suitable apertures in the mounting plates 46 and 48 and through the shaft 36 to secure the two mounting plates to the shaft for rotation therewith about a horizontal axis.

Each of the U-shaped channel members are positioned with its base parallel to the longitudinal axis of the shaft 36 and with its legs extending perpendicular to the longitudinal axis of the shaft and in the direction which the shaft is rotated. In this fashion, the U-shaped channel members serve as scoops to dig into the dry bulk particulate material and convey it toward the nozzle suction end. The U-shaped channel members 50 and 51 further serve to break up lumps in the dry bulk particulate material and permit cleaning down to the floor of the barge or vessel in which the particulate material has been transported.

The row of U-shaped channels 50 on the mounting plate 46 are spaced apart a distance which is slightly less than or equal to the length of the base of the U-shaped channel. The U-shaped channel members 51 on the lower mounting plate 48 are spaced apart the same distance. The U-shaped channel members on one plate are offset relative to the U-shaped channel members of the other plate and thus aligned relative to the spaces between channel members on the opposite plate so that upon rotation of the shaft 36 all the dry bulk particulate material is conveyed by either the channel members 50 or 51, i.e., there are no gaps in feeding along the width of the nozzle.

With reference to FIG. 6, a second form of the paddle means 38 is mounted on a shaft 36 will now be illustrated. Upper and lower mounting plates 56, 58 respectively, are secured by bolts 52 to the horizontally rotatable shaft 36. In lieu of U-shaped channel members, a plurality of V-shaped channel members 60, 61 are welded to the mounting plates 56, 58. Again, the V-shaped channel members in a given row are spaced apart and the channel members of one row are offset laterally relative to the channel members on the opposite row so that during rotation of the shaft 36 there is complete coverage along the longitudinal working extent or width of the aerator. Again the V-shaped channels break up lumps in the dry bulk particulate material and permit cleaning down to the bottom of the barge or vessel.

In the embodiments heretofore described, the shaft 36, the mounting plates and the channel members are all made of metal. In FIG. 7, yet another configuration of paddle means 38 is illustrated mounted on the horizontally rotatable shaft 36. Again upper and lower mounting plates 66, 68 are provided and these are elongated plates mounted on opposite sides of the shaft 36. However, in the embodiment of FIG. 7, the paddle means includes elongated flat plates 70, 72 having a width perpendicular to their longitudinal axis which is greater than the width of the mounting plates 66, 68 and greater than the width of the shaft 36. The paddle means of FIG. 7 also includes bolts 52 to secure the mounting plates 66 and 68 to the shaft. However, in the embodiment of FIG. 7, the plates 70 and 72 are provided with apertures so that a mounting bolt 52 will extend through the plate 66, through the plate 70, through the shaft 36, through the plate 72 and then through the mounting plate 68.

In the embodiment of FIG. 7, the plates 70 and 72 may be made of a hard rubber material which makes this type of paddle means preferable in the handling of grain. However, the advantages heretofore described with respect to the paddles means of FIGS. 5 and 6 are also provided using the rubber plates 70 and 72 in that any lumps in the dry bulk particulate material are broken up and the plates 70 and 72 clean down to the bottom of the barge or other vessel. Metal plates may, of course, be used in the configuration of FIG. 7. In the configuration of FIGS. 5 and 6, the entire paddle means is made of metal.

The provision of the mounting plates 46 and 48 in FIG. 5, 56 and 58 in FIG. 6 and 66 and 68 in FIG. 7 permit interchangeability of the paddle means. Hence a particular suction nozzle is not restricted to a particular type of dry bulk particulate material but by a suitable change of the paddle means can be utilized in different kinds of particulate material. Furthermore, should any of the channel members start to wear, an entire row of channel members may be replaced by simply unbolting the mounting plate from the shaft and replacing the entire mounting plate and channel combination. Notwithstanding the interchangeability of paddle means with respect to a single driven shaft 36, it has been found that the embodiment of FIG. 7 is suitable for grain and suitable for dry or normal cement powder while the configuration of FIG. 5 is preferred for breaking up lumps in the dry bulk particulate material. All three of the embodiments are equally effective in cleaning down to the bottom of the barge or the like and the embodiment of FIGS. 5 and 6 can be used quite effectively in normal or dry cement powder. However, the embodiment of FIG. 7 is preferred in dry cement powder since it is less costly and does not require the welding of channel members onto the plate and furthermore, if made of a resilient material exhibits a longer useful life.

Having thus described the mechanical aerating means including the paddle means of the present invention, reference should now be had to FIG. 3 for a further description of the suction end 12 of the nozzle. The front and rear faces 20, 22 of the nozzle are generally tapered toward each other at the suction end of the nozzle as illustrated generally in FIG. 3 and more specifically in FIG. 1. However, at the suction end 12 of the nozzle, the bottom of the front and rear faces 20 and 22 of the nozzle are flared outwardly with the front nozzle face 20 being flared forwardly as at 80 and the rear nozzle face 22 being flared rearwardly as at 82. A scraper means is provided and extends the full working width of the aerator. The scraper means 84 comprises an elongated inverted T-shaped member having an elongated vertical plate 86 forming the leg of the "T" and an elongated horizontal plate 88 forming the head of the "T". A series of spaced apart support members or gusset plates 90 extend along the length of the nozzle and are welded to the nozzle flares 80 or 82 and to the top of the vertical leg 86 of the scraper means to support the scraper means and maintain it in position.

The nozzle means further includes a shroud 92 for reducing dust emission during the operation of the nozzle. The shroud includes two horizontal plates 94, 96.

The first plate 94 extends horizontally and forwardly of the front face 20 of the nozzle, just above the flared end 80, and the second plate 96 extends horizontally and rearwardly from the rear face 22 of the nozzle just above the flare 82. Both of the plates 94 and 96 extend longitudinally the width of the nozzle. Cover plates 98, 100 are provided, one for the horizontal plate 94 and one for the horizontal plate 96, respectively. These plates serve as support members for the horizontal plates and further serve to close off the area above the horizontal plates 94 and 96 to prevent the buildup of dry bulk particulate material thereupon. Thus the support plates 98 and 100 are inclined with the plate 96 having one end secured to the front face 20 of the nozzle and having the other end thereof secured to the outer edge of the plate 94. Similarly, the plate 100 has its upper end welded to the rear face 22 of the nozzle and its lower end welded to the edge of the horizontal plate 96. Plates 98 and 100 also extend the full width of the nozzle.

The operation of the nozzle will now be explained. When it is desired to unload dry bulk particulate material from a vessel, the suction or vacuum source is actuated, the motors 40 and 42 are actuated and the entire nozzle assembly is dropped into the dry bulk particulate material. The weight of the nozzle assembly permits it being dry all the way to the bottom of the vessel. For this reason, and to prevent clogging the nozzle suction end when the nozzle assembly is dropped into the dry bulk particulate material, it is preferred that the horizontal bar 88 of the scraper means 84 is wider, from front to back, than the flared open end of the nozzle. The rotation of the aerators and specifically the paddle means breaks up lumps in the dry bulk particulate material and permits cleaning down to the bottom of the vessel. As the dry bulk particulate material in a particular portion of the vessel is removed, the nozzle is dragged along the bottom of the vessel to another portion of the vessel for further removal of dry bulk particulate material. By virtue of the provision of two mechanical aerators, the nozzle assembly may be moved in either direction, i.e., to the left or to the right as seen in FIGS. 1 and 3. The scraper means 84 assists the paddle means including down to the floor or bottom of the vessel. Furthermore, the scraper means 84 cooperates with the paddles means to break up any lumps in the dry bulk particulate material. More specifically, any lumps of the dry bulk particulate material which are not broken up by the paddle means will be impacted against the scraper means to assist in breaking up such lumps.

As the mechanical aerators are rotating or spinning about their horizontal axes, the dry bulk particulate material is feed or conveyed upwardly toward the nozzle open end. By providing the flare 80, 82 at the nozzle open end, a greater opening is provided to receive the dry bulk particulate material. This flared open end provides two important functions.

A first function is that the flared members 80 and 82 also serve as an impact point to assist in breaking up lumps of the dry bulk particulate material. A second function is that the flared open end of the nozzle serves to direct the flow of material and thus reduce air loss. In other words, as the aerating means rotates through the dry bulk particulate material, more air and more dry bulk particulate material enters the open end of the nozzle than if the flare were not present.

The shroud means 92 of the present invention assists the flared nozzle end in reducing air loss and thereby controlling dust by preventing the aerated dry bulk particulate material from becoming airborne. In other words, the dry bulk particulate material which is aerated cannot be conveyed upwardly and exteriorly of the nozzle open end because of the provision of the shroud means. Instead, any such material which is not fed into the nozzle open end will impact shroud means 92 and fall back downwardly to the bottom of the barge and will thereagain be picked up by the paddle means and conveyed into the suction end 12 of the nozzle.

The foregoing is a complete description of a preferred embodiment of the present invention. What is quite important is the fact that the mechanical aerators are mounted on horizontal axes and rotatable relative to a horizontal axis as contrasted with the prior art techniques of rotating scoops or aerators about a vertical axis.

With reference now to FIG. 8, 9 and 10, a second embodiment of the present invention will be described. The embodiment of FIGS. 8, 9 and 10 may utilize any of the paddle configurations of FIGS. 5, 6 and 7. The embodiment of FIGS. 8 through 10 is designed for a smaller capacity unloading system. In the embodiment of FIGS. 8, 9 and 10, only a single mechanical aerator is provided thereby necessitating certain changes in the supporting structure at the suction end of the nozzle.

Specifically, with reference to FIGS. 8 through 11, the nozzle assembly includes front and rear faces 20 and 22 and side plates 24 and 26 along with the tube 14 for providing the transport medium to the nozzle. Also, end plates 28 and 28$^1$ are provided at opposite sides of the nozzle assembly to receive and support the horizontally mounted rotatable shaft 36 of the aerator. However, only one such shaft 36 is provided in this embodiment. Consequently, only a single motor 40 is provided within a suitable housing 30 at one end of the nozzle assembly.

In the embodiment of FIGS. 8 through 11, the rear face 22 of the nozzle extends downwardly as at 102 to function as the scraper means to assist in breaking up lumps of the dry bulk particulate material and to enable cleaning down to the bottom or floor of the vessel. However, with reference to FIG. 8, the nozzle assembly can only be moved in one direction once it is in the dry bulk particulate material.

In other words, since the nozzle assembly of FIG. 8 is only open on the front face, the nozzle assembly may only be advanced in one direction along the barge as contrasted to the embodiment of FIGS. 1, 2 and 3 wherein aerators are provided on both the front and rear faces of the assembly and thus the nozzle assembly may be moved in either a forward or rearward direction within the dry bulk particulate material.

As illustrated in FIGS. 10 and 11, shroud means 92 are provided including a single horizontal plate 104 is provided extending forwardly from the front face 20 of the nozzle and a single plate 106 secured at an angle to the horizontal plate 104 and the front face 20 of the nozzle is provided to prevent the buildup of dry bulk particulate material on the shroud means.

As in the embodiment of FIGS. 1 through 4, the embodiment of FIGS. 8 through 11 provides a flare 108 at one end of the nozzle face, specifically the front nozzle face 20, to aid in reducing air losses and aid in breaking up lumps in the cement. The direction of rotation of the mechanical aerators of this embodiment is clockwise as seen in FIGS. 8 and 11 so that the dry bulk particulate material is conveyed and fed toward the suction end of the nozzle.

The foregoing is a complete description of the preferred embodiment of the present invention along with a modification which provides an equally efficient, lower capacity assembly. Various changes may, of course, be made without departing from the spirit and scope of the present invention. The invention should, therefore, be limited only by the scope of the following claims.

What is claimed is:

1. In a nozzle assembly for unloading dry bulk particulate material from a vessel, barge, ship or the like, including a nozzle having a suction end into which the dry bulk particulate material is introduced, the improvement comprising:
   a mechanical aerator mounted to said nozzle assembly adjacent said nozzle suction end;
   said aerator rotatably mounted about a horizontal axis;
   said aerator including an elongated shaft and paddle means secured to said shaft;
   said paddle means for breaking up lumps in said dry bulk particulate material and for cleaning said dry bulk particulate material from the floor of said vessel and conveying the same toward said nozzle suction end;
   said paddle means comprising a first series of spaced apart U or V-shaped channel members secured to one side of said shaft and a second series of U or V-shaped channel members secured to the other side of said shaft, the U or V-shaped channel members in said first series being offset laterally relative to the U or V-shaped channel members in said second series;
   the rotation of said aerator about said horizontal axis for aerating said dry bulk particulate material and conveying said dry bulk particulate material toward said nozzle suction end.

2. The invention as defined in claim 1 wherein said nozzle assembly further includes a scraper means secured to and extending downwardly from the suction end of said nozzle and extending below said mechanical aerator;
   said scraper means and said mechanical aerator cooperating to break up lumps in said dry bulk particulate material and further cooperating to clean to the floor of said vessel, barge, ship or the like.

3. The invention as defined in claim 1 wherein the suction end of said nozzle is flared outwardly toward said horizontal axis to increase the effective opening of said nozzle suction end and to cooperate with said mechanical aerator for breaking up lumps in said dry bulk particulate material.

4. The invention as defined in claim 1 wherein said nozzle assembly further includes lateral shroud means mounted above said nozzle suction end;
   said shroud means extending perpendicular to said horizontal axis and cooperating with said mechanical aerators for preventing said dry bulk particulate material from becoming airborne.

5. The invention as defined in claim 1 wherein said nozzle assembly further includes:
   a flared opening of said suction end of said nozzle and a scraper means depending downwardly from the flared suction end of said nozzle;
   said flared opening extending toward said horizontal axis and said scraper means extending below said mechanical aerator;
   said flared nozzle end and said scraper means cooperating with said aerator to break up lumps in said dry bulk particulate material.

6. The invention as defined in claim 1 wherein said nozzle assembly further includes a scraper means depending downwardly from the suction end of said nozzle and extending below said mechanical aerator;
   said nozzle suction end being flared outwardly toward said horizontal axis to increase the effective opening of said nozzle suction end; and
   shroud means extending horizontally outwardly from said nozzle suction end perpendicular to said axis and above said nozzle flare;
   said nozzle scraper and flare cooperating with said mechanical aerator for breaking up lumps in said dry bulk particulate material;
   said scraper means and said mechanical aerator for cleaning to the floor of said vessel; and
   said nozzle flare and said shroud cooperating to reduce air loss and reduce dust caused by the aerating and conveying of said dry bulk particulate material.

7. In a nozzle assembly for unloading dry bulk particulate material from a vessel such as a barge, ship or the like, including a nozzle having a suction end into which the dry bulk particulate material is introduced, the improvement comprising:
   a pair of mechanical aerators mounted to said nozzle assembly adjacent said nozzle suction end;
   each of said mechanical aerators rotatably mounted about a horizontal axis;
   said aerators being mounted in the same vertical plane and spaced apart relative to said horizontal axis;
   each of said aerators including an elongated shaft and paddle means secured to each said shaft;
   said paddle means for breaking up lumps in said dry bulk particulate material and for cleaning to the floor of said vessel;
   said paddle means comprising a first series of spaced apart U or V-shaped channel members secured to one side of said shaft and a second series of U or V-shaped channel members secured to the other side of said shaft, the U or V-shaped channel members in said first series being offset laterally relative to the U or V-shaped channel members in said second series;
   the rotation of said pair of aerators about said horizontal axes for aerating said dry bulk particulate material and conveying said dry bulk particulate material toward said nozzle suction end.

8. The invention as defined in claim 7 wherein said nozzle assembly further includes a scraper means secured to and extending downwardly from the suction end of said nozzle and extending below said pair of aerators;
   said scraper means and said pair of mechanical aerators cooperating to break up lumps in said dry bulk particulate material and further cooperating to clean to the floor of said vessel, barge, ship or the like.

9. The invention as defined in claim 7 wherein the suction end of said nozzle is flared outwardly in two directions toward said horizontal axes to increase the effective opening of said nozzle suction end and to cooperate with said mechanical aerators for breaking up lumps in said dry bulk particulate material.

10. The invention as defined in claim 7 wherein said nozzle assembly further includes shroud means mounted above said nozzle suction end;
   said shroud means extending toward each of the horizontal axes and cooperating with said mechanical aerators for preventing said dry bulk particulate material from becoming airborne.

11. The invention as defined in claim 7 wherein said nozzle assembly further includes:
   a flared opening of said suction end of said nozzle and a scraper means depending downwardly from the flared suction end of said nozzle;
   said flared opening extending toward each of said horizontal axes and said scraper extending below both of said aerators;
   said flared nozzle end and said scraper means cooperating with said aerators to break up lumps in said dry bulk particulate material.

12. The invention as defined in claim 7 wherein said nozzle assembly further includes a scraper means depending downwardly from the suction end of said nozzle and extending below said aerators;
   said nozzle suction end being flared outwardly toward each of said horizontal axes to increase the effective opening of said suction nozzle; and
   shroud means extending horizontally outwardly from said nozzle suction end above said nozzle flare;
   said nozzle scraper and flare cooperating with said mechanical aerators for breaking up lumps in said dry bulk particulate material;
   said scraper means and said mechanical aerators for cleaning to the floor of said vessel; and
   said nozzle flare and said shroud cooperating to reduce air loss and reduce dust caused by the aerating and conveying of said dry bulk particulate material.

* * * * *